United States Patent
Smith et al.

(10) Patent No.: US 8,493,872 B2
(45) Date of Patent: Jul. 23, 2013

(54) SYSTEM AND METHOD FOR MONITORING THE CONNECTIVITY OF A PATH BETWEEN NODES IN A NETWORK

(75) Inventors: Albert Smith, Richardson, TX (US);
Nimer Yaseen, Allen, TX (US); Zanjun Lu, Edison, NJ (US); Joseph K. Nguyen, Flower Mound, TX (US);
Stephen Graham, Fate, TX (US);
Sushanth Vallath, Calabasas, CA (US);
Steven M. Simmons, Dallas, TX (US)

(73) Assignee: Fujitsu Limited, Kawasaki-shi (JP)

( * ) Notice: Subject to any disclaimer, the term of this patent is extended or adjusted under 35 U.S.C. 154(b) by 432 days.

(21) Appl. No.: 12/748,019

(22) Filed: Mar. 26, 2010

(65) Prior Publication Data

US 2011/0038267 A1    Feb. 17, 2011

Related U.S. Application Data

(60) Provisional application No. 61/233,295, filed on Aug. 12, 2009.

(51) Int. Cl.
*H04J 1/16* (2006.01)
*H04L 12/26* (2006.01)

(52) U.S. Cl.
CPC ..................... *H04L 43/50* (2013.01)
USPC .......................... 370/248; 370/227

(58) Field of Classification Search
USPC .................. 370/216–228, 236, 241–252
See application file for complete search history.

(56) References Cited

U.S. PATENT DOCUMENTS

| 7,453,797 | B2 | 11/2008 | Deval et al. | 370/218 |
| 7,486,697 | B2 | 2/2009 | Fernandes et al. | 370/468 |
| 2007/0189177 | A1 | 8/2007 | Zhai | 370/244 |
| 2008/0089235 | A1* | 4/2008 | Kotrla et al. | 370/242 |
| 2008/0253295 | A1 | 10/2008 | Yumoto et al. | 370/245 |
| 2008/0291919 | A1 | 11/2008 | Dunbar et al. | 370/395.3 |
| 2009/0010171 | A1 | 1/2009 | Gupta et al. | 370/244 |
| 2009/0046723 | A1 | 2/2009 | Rahman et al. | 370/395.31 |
| 2012/0026871 | A1* | 2/2012 | Hu et al. | 370/230 |

FOREIGN PATENT DOCUMENTS

WO    2008/007353 A2    1/2008

OTHER PUBLICATIONS

European Office Action; Application No. 10 171 424.4-2416; pp. 3, Apr. 17, 2012.
European Extended Search Report, Application No. 10171424.4, 7 pages, Oct. 29, 2010.
IEEE; "Standard for Local and Metropolitan Area Networks—Link Aggregation"; IEEE Computer Society; pp. 163, Nov. 3, 2008.
Summons to Oral Proceedings Pursuant to Rule 115(1) EPC; Application No. 10171424.4-2416; pp. 4, Nov. 9, 2012.

* cited by examiner

*Primary Examiner* — Kan Yuen
(74) *Attorney, Agent, or Firm* — Baker Botts L.L.P.

(57) ABSTRACT

A method and system for determining a path between nodes in a network are disclosed. In accordance with an embodiment of the present disclosure, a system for determining a path between nodes in a network comprises a destination node and a link aggregation group (LAG) that includes a first link and a second link. The system further comprises a source node communicatively coupled to the destination node by the LAG where the source node, the LAG and the destination node form a path. The source node is operable to determine a link availability status for each of the first and second links using a layer-2 protection scheme. The source node is further operable to monitor the path for connectivity based on the link availability status using a layer-3 protection scheme.

19 Claims, 4 Drawing Sheets

SYSTEM AND METHOD FOR MONITORING THE CONNECTIVITY OF A PATH BETWEEN NODES IN A NETWORK

CROSS-REFERENCE TO RELATED APPLICATION

The application claims benefit under 35 U.S.C. 119(e) of U.S. Provisional Application Ser. No. 61/233,295 filed Aug. 12, 2009 entitled Network Protection Scheme.

TECHNICAL FIELD

The present disclosure relates generally to the field of communication systems and more specifically to a system and method for monitoring the connectivity of a path between nodes in a network.

BACKGROUND

Communication networks transport signals from one node to another node within the network via paths that may include a source node, zero, one, or more intermediate nodes, a destination node and one or more links. Links communicatively couple one node in the path to an adjacent node in the path. Multiple links in parallel may also connect one node in the path to an adjacent node in the path through link aggregation (e.g., IEEE 802.1AX-2008).

Communication networks may employ link aggregation to increase the link speed between nodes in the network and to increase redundancy for higher availability. In link aggregation, a group or set of links may be combined and represented as a single logical link to other nodes within the network. The single logical link may be referred to as a Link Aggregation Group (LAG).

In many communication networks, multiple paths may connect a source node and destination node such that there is a choice for how a signal travels from the source node to the destination node. Communication networks may select a path for communication between a source node and a destination node according to the availability of the paths.

When a LAG connects two nodes, the network may use a particular link in the LAG to determine the availability of a path. If the link within the LAG being used to transmit a signal along a path between source and destination nodes loses connectivity, network traffic may be rerouted along another path.

SUMMARY OF THE DISCLOSURE

In accordance with the present disclosure, disadvantages and problems associated with previous techniques for determining a path between nodes in a network may be reduced or eliminated.

In accordance with an embodiment of the present disclosure a system for determining a path between nodes in a network comprises a destination node and a link aggregation group (LAG) that includes a first link and a second link. The system further comprises a source node communicatively coupled to the destination node by the LAG with the source node, the LAG and the destination node forming a path. The source node is operable to determine a link availability status for each of the first and second links using a layer-2 protection scheme. The source node is further operable to monitor the path for connectivity based on the link availability status using a layer-3 protection scheme.

In accordance with another embodiment of the present disclosure a method for determining a path between nodes in a network comprises determining a link availability status for each of a first link and a second link included in a link aggregation group (LAG) using a layer-2 protection scheme. The LAG communicatively couples a source node to a destination node. The method further comprises monitoring the connectivity of a path based on the link availability status using a layer-3 protection scheme. The path includes the source node, the LAG and the destination node.

In accordance with another embodiment of the present disclosure an apparatus for determining a path between nodes in a network comprises a link aggregation agent (LAA) communicatively coupled to a path management unit. The LAA is operable to determine a link availability status of each of a first link and a second link included in a link aggregation group (LAG) using a layer-2 protection scheme. The LAG communicatively couples a source node to a destination node. The LAA is further operable to select one of the first and second links for carrying traffic based on the link availability status using the layer-2 protection scheme. The apparatus further comprises a layer-3 protection (L3P) unit communicatively coupled to the link aggregation agent. The L3P unit is operable to receive the selected link from the LAA and monitor the connectivity of a path based on the selected link using a layer-3 protection scheme. The path includes the source node, the LAG and the destination node.

BRIEF DESCRIPTION OF THE DRAWINGS

For a more complete understanding of the present disclosure, and the advantages thereof, reference is now made to the following written description taken in conjunction with the accompanying drawings, in which.

DETAILED DESCRIPTION

Embodiments of the present disclosure and its advantages are best understood by referring to FIGS. 1 through 4, where like numbers are used to indicate like and corresponding parts.

Figure 1:
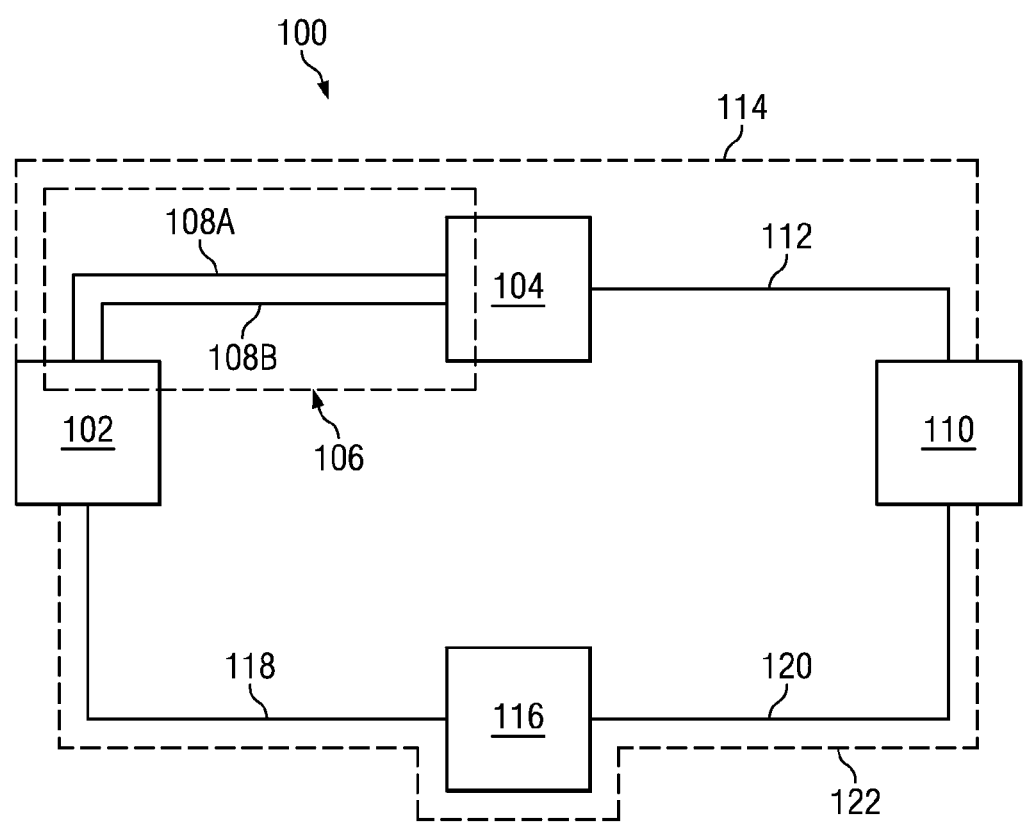
FIG. 1 illustrates a block diagram of a system that may be used to monitor the connectivity of a path between nodes in a network according to teachings of the present disclosure.

FIG. 1 illustrates a block diagram of a system 100 that may be used to monitor the connectivity of a path between nodes in a network. In certain embodiments, the network may be a communication network. A communication network allows nodes to communicate with other nodes. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the proceeding.

A communication network may include nodes and transmission media that facilitate the communication of signals between nodes within the network. The communication of signals between and within nodes may be referred to as "traffic." Traffic may be information transmitted, stored, or sorted within the communication network. Such traffic may comprise optical or electrical signals configured to encode audio, video, textual, or any other suitable data. The data may also be real-time or non-real-time. Traffic may be communicated via any suitable communications protocol, including, without limitation, the Open Systems Interconnection (OSI) standard and Internet Protocol (IP). Additionally, traffic may be structured in any appropriate manner including, but not limited to, being structured in frames, packets, or an unstructured bit stream.

Further, traffic may include carrier traffic and management traffic. Carrier traffic is typically data communicated by users of a communication network. Management traffic is typically associated with a provider of a communication network and may be used for provisioning network equipment, tracking network statuses, monitoring paths and links and other network management functionality.

A node may be a network element that receives or transmits traffic within the network. A network element may be any system, apparatus or device that may be configured to route traffic through, to, or from a network. Examples of network elements include routers, switches, reconfigurable optical add-drop multiplexers (ROADMs), wavelength division multiplexers (WDMs), access gateways, intra-connected switch pair, endpoints, softswitch servers, trunk gateways, or a network management system.

Nodes may include various components including, but not limited to an interface, a port, logic, memory or other suitable element. An interface may receive input, send output, process the input or output, or perform other suitable operations. An interface may comprise hardware, software or a combination of both.

A port may include any system, device or apparatus configured to serve as a physical interface between a corresponding transmission medium and network interface. A port may also include the hardware, software or a combination of both configured to facilitate the flow of traffic through the port and the transmission medium. In some embodiments a port may include, but is not limited to an Ethernet port, a USB port, a Firewire port, a WiFi transmitter/receiver, or a Bluetooth transmitter/receiver.

Logic within the node may perform the operations of the components. For example, logic may execute instructions to route input signals to their appropriate output destination. Logic may include hardware, software, other logic or any combination thereof. Logic may be encoded in one or more tangible media and may perform operations when executed by a computer. Certain logic, such as a processor, may manage the operation of a component. Examples of a processor include one or more computers, one or more microprocessors, one or more applications, or other logic.

In particular embodiments, computer readable media encoded with a computer program, software, computer executable instructions, or instructions capable of being executed by a computer may perform the operations of the nodes or components. In other embodiments, computer readable media storing a computer program, embodied with a computer program, encoded with a computer program, having a stored computer program or having an encoded computer program may perform the operations of the embodiments.

Memory may comprise one or more tangible, computer-readable, or computer executable storage medium that stores information. Examples of memory include computer memory (e.g., Random Access Memory (RAM), Read Only Memory (ROM)), mass storage media (e.g., a hard disk), removable storage media (e.g., a Compact Disk (CD), a Digital Video Disk (DVD), or a flash memory drive), database or network storage (e.g., a server), or other computer-readable medium.

A transmission medium may include any system, device or apparatus configured to couple corresponding ports of nodes to each other and transmit traffic between the corresponding ports. For example, a transmission medium may include an optical fiber, a T1 cable, a WiFi signal, a Bluetooth signal, or any other suitable medium.

A link may describe the communicative connection between two adjacent nodes. A link may be a physical or logical connection between adjacent nodes. A physical link may include the corresponding physical ports and transmission medium that couple adjacent nodes to each other. Further, a physical link may include one or more logical links that connect adjacent nodes.

In some embodiments, a group or set of physical links in parallel may form a link aggregation group (LAG). The LAG may be represented as a single logical link even though it may include multiple physical links. Nodes may "see" the LAG as a single logical communication link.

A link aggregation agent (LAA) within a node may manage a LAG. The LAA may include logic encoded in hardware, software or a combination of both. The LAA may use various protocols such as a link aggregation control protocol (LACP) to govern the configuration of a LAG and to govern the allocation of traffic through the links within the LAG.

The various functions and protocols within a network that facilitate the transmission of traffic from one node to another may be logically organized into layers. The protocols and functions used to transmit traffic across a link between adjacent nodes may be referred to as layer-2. Layer-2 may also include protection schemes and protocols that detect errors in communication across a link that may indicate that a link is not available or "down" (e.g., lost, unstable or restricted).

An example layer-2 protection scheme may include a LAG. A node may be communicatively coupled to an adjacent node with a LAG. The node may include a LAA that uses a layer-2 protocol such as LACP to monitor the connectivity of links within the LAG and detect errors among the links within the LAG such as a "Loss of Signal" (LOS), "Card Pulls", "Forced Switches" and "Unstable transport." After detecting errors, the LAA may determine that a link within the LAG is "down." The LAA may use LACP to recover from the "down" link by directing traffic to a link within the LAG that is "up" (e.g., available for carrying traffic).

Layer-2 protocols and protection schemes are limited to managing the traffic on links between adjacent nodes. However, in most networks, traffic may travel from one node (a source node) to another node (a destination node) along a path that includes the source node, one or more links, zero, one, or more intermediate nodes and the destination node. Another set of protocols and protection schemes may be needed to transmit traffic along paths.

The functions and protocols used to transmit traffic in the network along a path from a source node to a destination node may be referred to as layer-3. Layer-3 may also include protection schemes and protocols to detect errors in a path and recover from those errors.

A layer-3 protection scheme may monitor a path for connectivity to detect errors associated with the links or nodes within the path. If the path experiences lost or reduced connectivity that inhibits communication along the path, the layer-3 protection scheme may determine that the path has insufficient connectivity and is "down" or not available for transmitting traffic. A path may lose connectivity if a link or node within the path goes "down."

If a layer-3 protection scheme determines that a path is "down", it may determine that traffic should be routed along another path from the source node to the destination node. The other path may include one or more different links or nodes not included in the original path. A layer-3 protocol and protection scheme may be implemented by logic within a node. That logic may be included in any suitable component within the node, such as a processor included within an interface.

A layer-3 protection scheme may include a bi-directional forwarding detection (BFD) protocol. In the BFD protocol, a source node may send heartbeat or "hello" messages to a destination node along a path to determine the connectivity of the path. If the path is functioning properly, the destination node may receive the heartbeat message and send a return heartbeat message to the source node. If the source node receives the return message, the source node may determine that the path is available and functioning properly.

If the source node does not receive a return heartbeat message, the return heartbeat message takes too long to return, or the return heartbeat message is corrupted, the BFD protocol may determine that the path has insufficient connectivity and is not available for carrying traffic. Thus, the protocol may determine that traffic needs to be routed along a different path to reach the destination node In conventional network configurations, the layer-2 and layer-3 protection schemes may operate independently of each other and cause undesired results. For example, a source node may be communicatively coupled to an intermediate node by a first LAG, and the intermediate node may be communicatively coupled to a destination node by another link, creating a first path from the source node to the destination node. The source node may also be communicatively coupled to another intermediate node by another link and that other intermediate node may be communicatively coupled to the destination node by yet another link, forming a second path from the source node to the destination node.

The source node may include a layer-3 protection scheme (e.g., BFD) that may detect errors along the first and second paths and may initiate a switchover of traffic between paths when a path goes down. The source node may also include a layer-2 protection scheme (e.g., LACP) that detects errors among the links within the LAG, and selects an active link for carrying traffic through the LAG.

The source node may route traffic to the destination node primarily along the first path. Although the LAG may include multiple physical links, the layer-3 protection scheme may only send heartbeat messages through one physical link within the LAG to determine if the first path is available for carrying traffic. The layer-2 protection scheme may also independently monitor the links within the LAG to determine their availability.

The link within the LAG that the layer-3 protection scheme is using may lose connectivity. The layer-2 protection scheme may determine that the link is "down" and may initiate a switchover of traffic to an available link within the LAG. However, the layer-3 protection scheme may also detect the lost connectivity caused by the "down" link and determine that the entire first path is not available for communication, even though other links within the LAG may be available for carrying traffic along the first path.

Based on this determination, the layer-3 protection scheme may initiate a rerouting of traffic from the first path to the second path. This rerouting may take up to ten (10) seconds, whereas the switchover of links may take approximately 100-300 milliseconds. The rerouting of traffic along the second path may cause an unnecessary delay in communication between the source node and the destination node.

To prevent this problem, embodiments of the present disclosure provide systems and methods where the layer-2 protection scheme communicates with the layer-3 protection scheme. Specifically, when a link within the LAG is unavailable for transmitting traffic, the layer-2 protection scheme may notify the layer-3 protection scheme that another link within the LAG may be available for transmitting traffic. Therefore, the layer-3 protection scheme may switch from monitoring the path through the "down" link in the LAG to monitoring the path through an available link in the LAG and, thus, not unnecessarily report that the first path is "down." Accordingly, the communication between the layer-2 and layer-3 protection schemes may decrease unnecessary rerouting of traffic along paths and reduce delays in the transmission of traffic from a source node to a destination node. FIG. 1 illustrates an embodiment of a system that solves these problems.

In FIG. 1, a system 100 may monitor a path for connectivity. System 100 may include a source node 102 communicatively coupled to an intermediate node 104 by a LAG 106 that includes links 108A and 108B. Intermediate node 104 may also be communicatively coupled to destination node 110 via link 112. Although not expressly show, link 112 may be also be a LAG. Source node 102, LAG 106, intermediate node 104, link 112 and destination node 110 may form a path 114 from source node 102 to destination node 110. Path 114, LAG 106, including links 108A and 108B, intermediate node 104, and link 112 may be used to route traffic between source node 102 and destination node 110.

Source node 102 may also be communicatively coupled to an intermediate node 116 via a link 118. Intermediate node 116 may be communicatively coupled to destination node 110 via a link 120. Although not expressly shown links 118 and 120 may be LAGs. A path 122 may include source node 102, link 118, intermediate node 116, link 120 and destination node 110. Path 122, link 118, intermediate node 116 and link 120 may also be used to route traffic between source node 102 and destination node 110.

Nodes 102, 104, 110 and 116 may be network elements that act as source nodes, destination nodes, next-hop nodes, network management systems, network operations centers, etc. Further, although depicted as single links, links 112, 118 and 120 may each be LAGs that include more than one physical link. Additionally, even though LAG 106 is shown has having two links, it should not be limited to such and it may include more than two links.

In operation, source node 102 may use a layer-2 protection scheme to monitor the connectivity of links 108A and 108B and determine a link availability status of links 108A and 108B based on the connectivity. The link availability status may indicate that links 108A or 108B are available or not available for carrying traffic. Based on the link availability status, source node 102 may use a layer-2 protection scheme to select link 108A or 108B for communication between source node 102 and intermediate node 104.

The layer-2 protection scheme may include LACP or any other suitable protocol to manage LAG 106. These protocols may be used to monitor the links, determine the link availability status and select one of the links for communication between the source node and the intermediate node. For example, source node 102 may use LACP to monitor links 108A and 108B for connectivity. If link 108B loses connectivity, but link 108A does not, source node 102 may use LACP to determine that link 108A is available for carrying traffic (e.g., "up") but that link 108B is not available for carrying traffic (e.g., "down"). Source node 102 may use LACP to select link 108A for routing traffic between source node 102 and intermediate node 104 based on the link availability status.

Similarly, source node 102 may also use a layer-3 protection scheme to monitor paths 114 and 122 for connectivity to determine a path availability status of paths 114 and 122. Source node 102 may select a path for routing traffic from source node 102 to destination node 110 based on the path availability status.

The layer-3 protection scheme may use BFD or any other suitable protocol to implement the layer-3 protection scheme. These protocols may be used to monitor the paths, determine the path availability status and route traffic along the best path from source node 102 to destination node 110 based on the path availability status. For example, source node 102 may use BFD to monitor paths 114 and 122 for connectivity and source node 102 may determine that path 114 has connectivity, but that path 122 has lost or reduced connectivity. BFD may detect the connectivity of each of paths 114 and 122 and may determine a path availability status that indicates that path 114 is available for sending traffic from source node 102 to destination node 110, but that path 122 is not available. According to the path availability status, BFD may direct routing of traffic from source node 102 to destination node 110 along path 114.

The layer-3 protection scheme may additionally monitor the paths and determine the path availability status based on the link availability status or link selection determined by the layer-2 protection scheme. For example, source node 102 may primarily route traffic from source node 102 to destination node 110 over path 114. The layer-3 protection scheme may initially monitor path 114 for connectivity by routing management traffic, such as BFD heartbeat messages, through link 108A. Link 108A may lose connectivity, but link 108B may still be available for carrying traffic. The layer-2 protection scheme may determine a link availability status that indicates that link 108A is "down" and that link 108B is "up" and may select link 108B for routing traffic. The layer-2 protection scheme may communicate the link availability status to the layer-3 protection scheme. In another embodiment, the layer-2 protection scheme may communicate to the layer-3 protection scheme that link 108B is the selected link.

The layer-3 protection scheme may monitor path 114 for connectivity by routing the management traffic along path 114 through link 108B instead of link 108A based on the link availability status or the selected link information obtained from the layer-2 protection scheme. Thus, the layer-3 protection scheme may determine that path 114 is still available for routing traffic by monitoring path 114 through link 108B. Therefore, the layer-3 protection scheme may not falsely report that path 114 is "down" when only one physical link within LAG 106 is unavailable for transmitting traffic.

In another example, both links 108A and 108B may be "down," such that LAG 106 may be down. The layer-2 protection scheme may determine a link availability status that indicates that both links 108A and 108B are "down." Accordingly, source node 102 may use a layer-3 protocol to determine that traffic should be routed over path 122 instead of path 114.

Each node in system 100 may comprise any suitable system, apparatus or device operable to transmit and receive traffic. In the illustrated embodiment, each node may be operable to transmit traffic to one or more other nodes and receive traffic from one or more other nodes. An example of a node will be discussed in more detail with respect to FIG. 2.

Modifications, additions, or omissions may be made to system 100 without departing from the scope of the disclosure. For example, although the functionality of source node 102 is described, all nodes in system 100 may include some, none or all of the functionality described for source node 102. The components and elements of system 100 may be integrated or separated according to particular needs. Moreover, the operations of system 100 may be performed by more, fewer or other components or elements.

Figure 2:
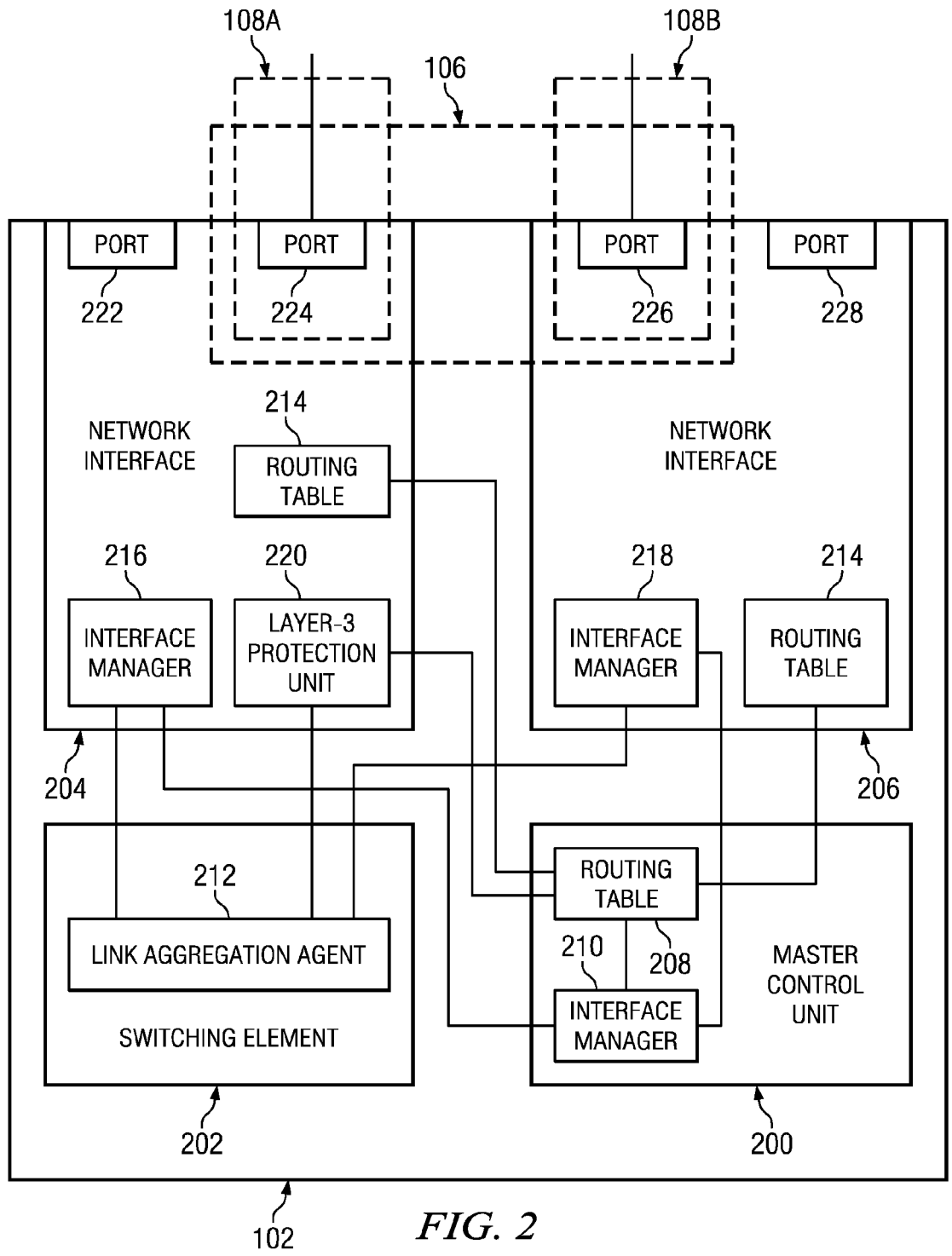
FIG. 2 illustrates a block diagram of a node illustrated in FIG. 1 that may be used to monitor the connectivity of a path between nodes in a network according to teachings of the present disclosure.

FIG. 2 illustrates a block diagram of source node 102 shown in FIG. 1 that may be used to facilitate monitoring the connectivity of a path between nodes in a network according to teachings of the present disclosure. As depicted in FIG. 2, source node 102 may include a master control unit 200, a switching element 202 and one or more network interfaces 204 or 206.

Master control unit 200 may include any suitable system, apparatus, or device configured to manage source node 102. Master control unit 200 may include logic encoded in software, hardware or a combination of both. Master control unit 200 may include a routing table 208 and an interface manager (IFM) 210.

Switching element 202 may include any suitable system, apparatus, or device configured to receive and route traffic. In certain embodiments switching element 202 may be a switch fabric (SWF). Switching element 202 may also include a LAA 212.

Network interface 204 may include ports 222 and 224 and network interface 206 may include ports 226 and 228. Port 224 may be associated with link 108A and port 226 may be associated with link 108B. Ports 224 and 226 and links 108A and 108B may form LAG 106. Ports 224 and 226, may be communicatively coupled to LAA 212.

Network interface 204 may include IFM 216, and Network interface 206 may include IFM 218. IFM's 216 and 218 may be communicatively coupled to LAA 212 and IFM 210. Network interfaces 204 and 206 may also include routing tables 214 that may be communicatively coupled to routing table 208.

Further, network interface 204 may include Layer-3 Protection (L3P) unit 220. L3P unit 220 may be communicatively coupled to ports 224 and 226. L3P unit 220 may be communicatively coupled to LAA 212 and routing table 208.

Master control unit 200 may include a routing table 208 configured to manage the routing of traffic within source node 102 and from source node 102 to other nodes within the network. Routing table 208 may include any table, database, file or other data structure configured to maintain information relating to routing traffic along the links and paths within the network that are associated with source node 102. Routing table 208 may determine which paths to route traffic along in accordance with open shortest path first (OSPF) protocol, intermediate system-intermediate system (ISIS) protocol, or any other suitable protocol. Routing table 208 may also distribute the path information to routing tables 214 associated with network interfaces 204 and 206.

L3P unit 220 may be configured to determine an availability status of paths from source node 102 to various destination nodes such as destination node 110 shown in FIG. 1. L3P unit 220 may use BFD or any other suitable protocol to monitor the availability of paths. L3P unit 220 may report to routing table 208 when a path is not available and routing table 208 may determine new routing information accordingly.

In one embodiment, source node 102 may primarily route traffic from source node 102 to destination node 110 over path 114 as shown in FIG. 1. L3P unit 220 may monitor the connectivity of path 114 from source node 102 to destination node 110 and determine the availability status of path 114 according to the connectivity. If path 114 loses connectivity such as link 112 going "down," L3P unit 220 may determine a path availability status for path 114 that indicates that path 114 is not available for carrying traffic. L3P unit 220 may report this information to routing table 208, and routing table 208 may calculate new routing information indicating that traffic should be routed from source node 102 to destination node 110 over path 122 (as shown in FIG. 1) instead of path 114. L3P unit 220 may monitor path 114 through link 108A or link 108B.

LAA 212 within switching element 202 may include any component configured to manage the aggregation of links associated with source node 102. For example, LAA 212 may be logic encoded in hardware, software or a combination of both. LAA 212 may be included in switching element 202, but it may also be included in any other suitable component associated with source node 102.

LAA 212 may manage LAGs according to LACP or another suitable protocol. In operation, LAA 212 may monitor the connectivity of each member link of a LAG to determine the link availability status of each link and may select a link for carrying traffic according to the link availability status. LAA 212 may report the selected link and link availability status to L3P unit 220 such that L3P unit 220 monitors path 114 through the selected, "up" link. Thus, L3P unit 220 will not unnecessarily report to routing table 108 that path 114 is "down" when another link within the LAG may be available.

LAA 212 may also report the selected link and link availability status to one or more IFMs 216 and 218 associated with the links. IFMs 216 and 218 may report the link information to IFM 210, which may report the link availability status and selected link to routing table 208 such that routing table 208 may route traffic accordingly.

For example, in some embodiments LAA 212 may manage LAG 106, which may include links 108A and 108B. LAA 212 may initially select link 108A as the active link for carrying traffic and link 108B as the standby link if link 108A loses connectivity. LAG 106 may communicatively couple source node 102 through port 224 in network interface 204 to an intermediate node such as intermediate node 104 in FIG. 1.

LAA 212 may determine a link availability status of links 108A and 108B by monitoring the connectivity of links 108A and 108B. L3P unit 220 may initially monitor the connectivity of path 114 through link 108A by sending layer-3 management traffic, such as BFD heartbeat messages, through port 224.

Link 108A may lose connectivity, but link 108B may still have connectivity. Accordingly, LAA 212 may determine a link availability status that indicates that link 108A is "down" and that link 108B is "up." Based on the link availability status, LAA 212 may select link 108B as the active link in LAG 106 for communication between source node 102 and intermediate node 104.

LAA 212 may report to L3P unit 220 that link 108B is the selected link. Based on the link selection report, L3P unit 220 may monitor the connectivity of path 114 through link 108B instead of link 108A. Accordingly, layer-3 subsystem 220 may determine a path availability status for path 114 that indicates that path 114 is available for carrying traffic.

In addition to reporting to L3P unit 220, LAA 212 may report to IFM 216, associated with link 108A and port 224 and included in network interface 204, that link 108A is "down." LAA 212 may also report to IFM 218 included in network interface 206 that link 108B is the selected, active link.

IFM's 216 and 218 may report to IFM 210, within master control unit 200, that link 108A is "down" and that link 108B is the selected, active link. IFM 210 may report this information to routing table 208. Routing table 208 may calculate new routing information that may indicate that traffic should be routed through port 226 associated with link 108B instead of port 224 associated with link 108A. Routing table 208 may forward the new routing information to routing tables 214 included in network interfaces 204 and 206.

In another example, if both links 108A and 108B go "down," LAA 212 may report to IFM 216 that link 108A is "down" and it may report to IFM 218 that link 108B is "down." IFMs 216 and 218 may report this information to IFM 210, and IFM 210 may determine that LAG 106 is "down" and report that information to routing table 208. Accordingly, routing table 208 may determine that traffic should be routed from source node 102 to destination node 110 along path 122 instead of path 114. Routing table 208 may distribute this new routing information to routing tables 214 within source node 102, such as those included in network interfaces 204 and 206.

Modifications, additions, or omissions may be made to source node 102, or the components associated with source node 102 without departing from the scope of the disclosure. The components or elements of source node 102 may be integrated or separated. Moreover, the operations of source node 102 or the components associated with source node 102 may be performed by more, fewer, or other components. For example, L3P unit 220 may be included in network interface 206 or any other suitable component within source node 102. Additionally, the operations described herein may be performed using any suitable logic. Further, although FIG. 2 specifically describes source node 102, the functionality and components associate with source node 102 may be included in any node within a network.

Figure 3:
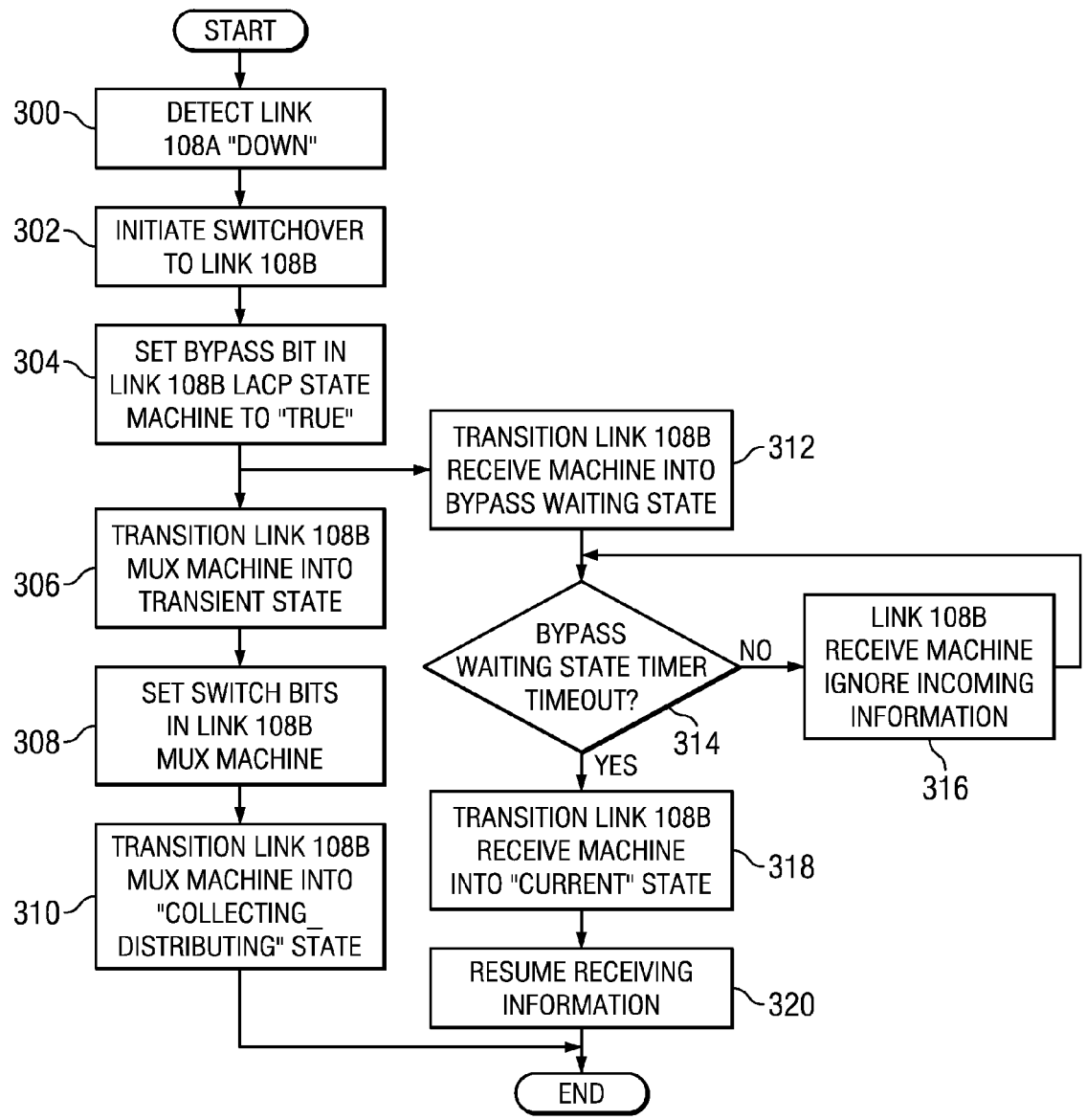
FIG. 3 illustrates a flow diagram of a method for enhancing an LACP state machine according to the teachings of the present disclosure.

FIG. 3 illustrates a method for enhancing an LACP state machine according to the teachings of the present disclosure. IEEE standard 802.1AX-2008 describes and defines a standardized LACP state machine, and is herein incorporated by reference in its entirety. The enhanced state machine may include implementing states that are additional to those states defined and standardized by IEEE 802.1AX-2008. The additional states may reduce the switchover delay. The enhanced state machine may be included in LAA 212 depicted in FIG. 2.

In some embodiments, a LAG may include two links, and one link may be an active link while the other link may be a standby link that does not carry traffic unless the active link experiences a problem. Conventional layer-2 protocols such as LACP may take up to approximately three hundred (300) milliseconds to detect an error and initiate a switchover from the active link to the standby link in a LAG. Conventional BFD protocols may detect an error in a path and initiate a rerouting along a different path within approximately one hundred (100) milliseconds, even though the actual rerouting may take up to 10 seconds. Therefore, conventional BFD protocols may detect an error on a link within a LAG and initiate a rerouting of traffic along a different path before the LACP switchover occurs.

In the present disclosure, LAA 212 may include enhanced layer-2 protocols to reduce the switchover time when an active link in a LAG goes "down." By reducing the switchover time to less than one hundred (100) milliseconds, LAA 212 may report the switchover to L3P unit 220 before L3P unit 220 detects that the active link has gone "down" and initiates a complete rerouting of traffic over another path.

In an example embodiment, LAA 212 may include LAG 106 that includes links 108A and 108B. Link 108A may be the active link and link 108B may be the standby link. LAA 212 may include an LACP state machine that includes a mux machine associated with link 108A and a mux machine associated with link 108B. The mux machines may control whether the links are active or standby links. Each mux machine may include a transient state that may be an additional state between the "WAITING" state and the "COLLECTING_DISTRIBUTING" state in the mux machine.

When a mux machine is in the "COLLECTING_DISTRIBUTING" state, the link associated with that mux machine may be active. In a conventional state machine, the mux machine stays in the "WAITING" state until the "wait_while_timer" expires, thus a transition from standby to active mode—e.g., from "WAITING" to "COLLECTING_DISTRIBUTING"—may be delayed. The transient state may be included to allow transitioning from the "WAITING" state to the "COLLECTING_DISTRIBUTING" state before the "wait_while_timer" expires.

At step 300, LAA 212 may detect that link 108A is "down" and at step 302 LAA 212 may initiate a switchover for link 108B to become the active link and link 108A to become the standby link. The enhanced LACP state machine associated with link 108B may include a bypass bit that is set to "TRUE" when link 108B is to become the active link. The bypass bit may enable the mux machine associated with link 108B to transition from the "WAITING" state to the transient state before the "wait_while_timer" has expired; thus, allowing the mux machine to bypass the "wait_while_timer" and transition into the "COLLECTING_DISTRIBUTING" state.

The bypass bit in the LACP state machine associated with link 108B may be set to "TRUE" at step 304, thus initiating a switchover of link 108B from being the standby link to being the active link. At step 306, with the bypass bit being "TRUE," the mux machine for link 108B may transition from the "WAITING" state to the transient state even if the "wait_while_timer" has not timed out.

At step 308, switch bits within the LACP state machine, (e.g., "Actor.Sync," "Partner.Sync," "Partner.Collecting," and "Partner.Distributing") may be set to "TRUE." The mux machine may not transition to the "COLLECTING_DISTRIBUTING" state without the switch bits being set to "TRUE." At step 310, with the switch bits set to "TRUE," the mux machine for link 108B may transition to the "COLLECTING_DISTRIBUTING" state and link 108B may be the active link for carrying traffic.

Accordingly, the mux machine for link 108B may enter into the "COLLECTING_DISTRIBUTING" state before the "wait_while_timer" times out. Bypassing the "wait_while_timer" may reduce the switchover time from between approximately one hundred (100) and three hundred (300) milliseconds to less than one hundred (100) milliseconds. In one embodiment, the switchover time may be less than fifty (50) milliseconds; in another embodiment, the switchover time may be less than ten (10) milliseconds. In a further embodiment, the switchover time may be between approximately three (3) and five (5) milliseconds.

The state machines associated with links 108B and 108A may also include receive machines that control the reception of information associated with links 108A and 108B. LAA 212 may originally communicate with a corresponding LAA in intermediate node 104 that link 108A is the active link and that link 108B is the standby link. The LAA associated with intermediate node 104 may also convey the same information to LAA 212. The communication may ensure that both LAA's have designated link 108A as the active link and link 108B as the standby link. If LAA 212 has designated link 108A as the active link, but receives a communication from intermediate node 104 that indicates that link 108A is the standby link, LAA 212 may switch link 108A to the standby link.

When the bypass bit is set to "TRUE" at step 304, the receive machine associated with link 108B may transition from the "CURRENT" state into a bypass waiting state at step 312. LAA 212 may initiate the switchover of link 108B from being the standby link to being the active link before the LAA in intermediate node 104 detects the error on link 108A. Before detecting the error, the LAA in intermediate node 104 may communicate to LAA 212 that link 108B is still the standby link. The bypass waiting state may prevent the receive machine associated with link 108B from receiving the information that would improperly prompt LAA 212 to make link 108B the standby link again.

The bypass waiting state may include a bypass waiting state timer. At step 314, LAA 212 may determine if the bypass waiting state timer has expired. If the bypass waiting state timer has not expired, at step 316, the receive machine of link 108B may ignore any information related to link 108B sent from the LAA in intermediate node 104 to LAA 112, and the method returns to step 314.

Figure 4:
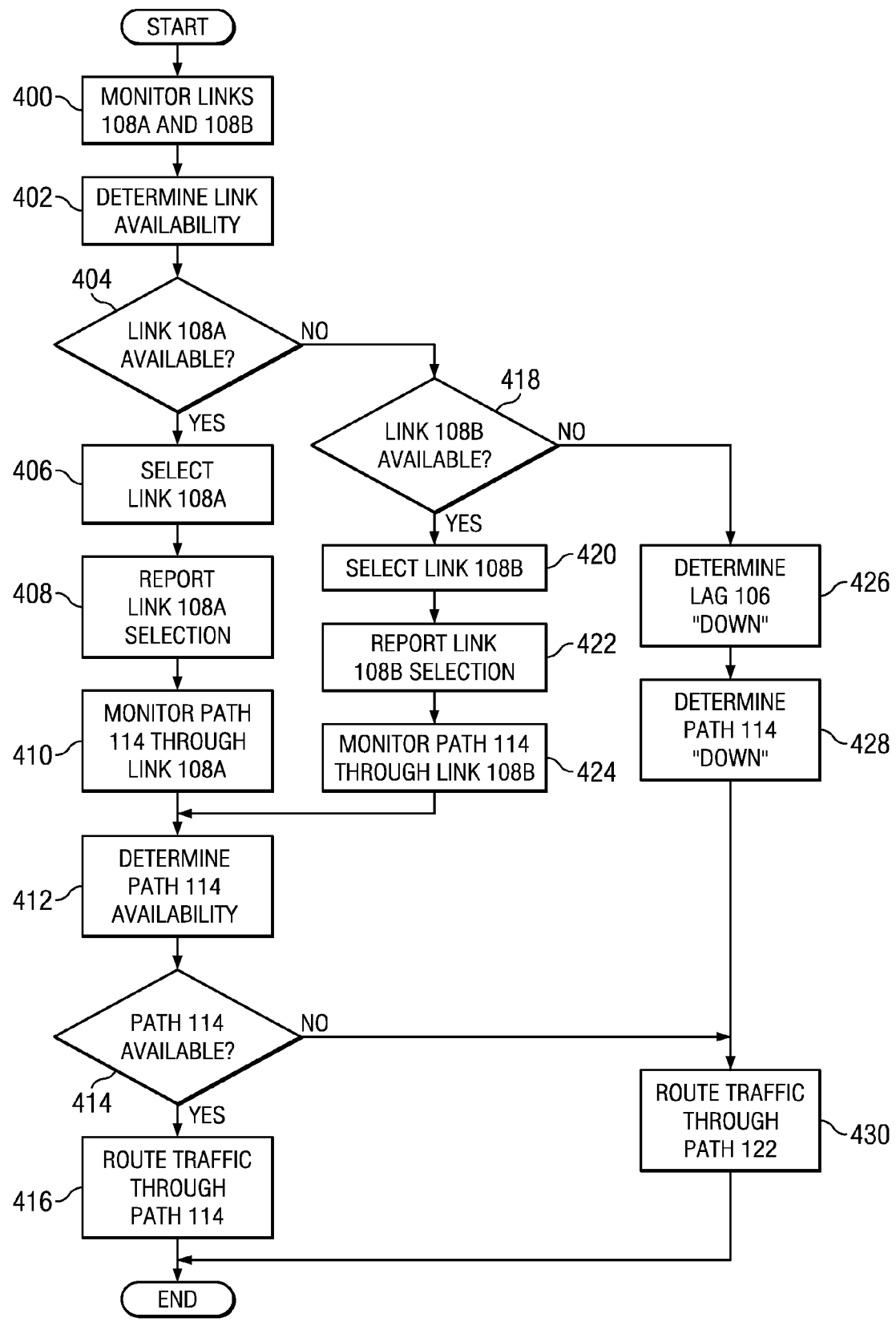
FIG. 4 illustrates a flow diagram of a method for monitoring the connectivity of a path between nodes in a network.

If the bypass waiting state timer has expired at state 314, the receive machine of link 108B may transition back into the "CURRENT" state at step 318. At step 320, the receive machine of link 108B may resume normally receiving information and the method may end. FIG. 4 illustrates a flow diagram of a method for monitoring the connectivity of a path in a network. The method in FIG. 4 may be performed generally by a node in system 100 as shown in FIG. 1. In the particular embodiment, source node 102 may perform the method with respect to system 100.

At step 400, source node 102 may monitor the connectivity of links 108A and 108B associated with LAG 106 and determine a link availability status for each of links 108A and 108B at step 402 using a layer-2 protection scheme protocol. Source node 102 may determine the link availability status using LACP or any other suitable layer-2 protocol.

At step 404, source node 102 may determine if link 108A is available for carrying traffic based on the link availability status. If the link availability status indicates that link 108A is available for carrying traffic, source node 102 may select link 108A for communication between source node 102 and intermediate node 104 at step 406 using a layer-2 protection scheme protocol. Source node 102 may select link 108A using LACP or any other suitable protocol.

At step 408, the layer-2 protection scheme (e.g., LACP) may report to a layer-3 protection scheme (e.g. BFD) that link 108A is the selected link for communication through LAG 106. Source node 102 may monitor path 114 through link 108A using the layer-3 protection scheme at step 410. At step 412 source node 102 may determine if path 114 is available for carrying traffic using the layer-3 protection scheme. The layer-3 protection scheme may use BFD or any other suitable protocol for monitoring path 114 and determining the availability of path 114.

At step 414, if path 114 is available, source node 102 may route traffic through path 114 at step 416 and the method ends. If path 114 is not available at step 414, the method may move to step 430 where source node 102 may route traffic through path 122 instead of path 114 if path 122 is available for carrying traffic (determining the availability of path 122 is not expressly shown), and the method ends. Path 114 may not be available even when LAG 106 is "up" if intermediate node 104 is not able to receive or transmit traffic or if link 112 goes "down."

If link 108A is not available for carrying traffic at step 304, the method may move to step 418 where source node 102 may determine if link 108B is available for carrying traffic based on the link availability status. If link 108B is available for carrying traffic, the method moves to step 420 where source node 102 may select link 108B for communication between source node 102 and intermediate node 104 using a layer-2 protection scheme protocol such as LACP.

The layer-2 protection scheme (e.g., LACP) in source node 102 may report to the layer-3 protection scheme (e.g., BFD) in source node 102 that link 108B is the selected, active link at step 422. Source node 102 may monitor path 114 through link 108B using the layer-3 protection scheme at step 424 and the method may move to step 412.

If link 108B is not available for carrying traffic at step 418, the method may move to step 426 where source node 102 may determine that LAG 106 is "down," (i.e., not available for carrying traffic). At step 428, source node 102 may determine that path 114 is "down" based on LAG 106 being "down," and at step 430 source node 102 may route traffic through path 122 instead of path 114 and the method ends.

One or more components within source node 102 may perform the steps described by the method in FIG. 4. Further, modifications, additions, or omissions may be made to the method illustrated in FIG. 4 without departing from the scope of the invention. For example, functions performed by individual components as described in FIG. 2 may be added to the method described in FIG. 4.

Certain embodiments of the invention may provide one or more technical advantages. A technical advantage may be that a node may monitor the connectivity of a path using a layer-3 protection scheme based on the availability status of links within a LAG determined by a layer-2 protection scheme. Another advantage may be reduced switchover time from a "down" link to an "up" link in link aggregation protocols.

Although this disclosure has been described in terms of certain embodiments, alterations and permutations of the embodiments are within the scope of the invention. Accordingly, the above description of embodiments does not constrain this disclosure. Other changes, substitutions, and alterations are possible without departing from the spirit and scope of this disclosure, as defined by the following claims.

What is claimed is:

1. A system for determining a path between nodes in a network, comprising:
    a destination node;
    a link aggregation group (LAG) including a first link and a second link; and
    a source node communicatively coupled to the destination node by the link aggregation group (LAG), the source node, the LAG and the destination node forming a path, the source node operable to:
        determine a link availability status for each of the first and second links using a layer-2 protection scheme, the layer-2 protection scheme includes a link aggregation control protocol (LACP), the link availability status determined using an enhanced LACP state machine that is operable to determine the link availability status and select one of the first and second links, the enhanced LACP state machine comprising a bypass bit configured to enable the enhanced LACP state machine to transition from a waiting state to a transient state before a wait timer associated with the layer-2 protection scheme has expired; and
        monitor the path for connectivity based on the link availability status using a layer-3 protection scheme.

2. The system of claim 1, wherein the layer-3 protection scheme source node includes a bi-directional forwarding detection (BFD) protocol.

3. The system of claim 1, wherein the link availability status indicates whether at least one of the first link and the second link is available for carrying traffic.

4. The system of claim 1, wherein the source node is further operable to select between one of the first and second links based on the link availability status using the layer-2 protection scheme.

5. The system of claim 4, wherein the source node is further operable to monitor the path for connectivity based on the selected link using the layer-3 protection scheme.

6. The system of claim 4, wherein the source node determines the link availability status and selects one of the first and second links in less than ten (10) milliseconds.

7. A method for determining a path between nodes in a network, comprising:
    determining a link availability status for each of a first link and a second link included in a link aggregation group (LAG) using a layer-2 protection scheme, the LAG communicatively coupling a source node to a destination node, the layer-2 protection scheme includes a link aggregation control protocol (LACP), the link availability status determined using an enhanced LACP state machine that is operable to determine the link availability status and select one of the first and second links, the enhanced LACP state machine comprising a bypass bit configured to enable the enhanced LACP state machine to transition from a waiting state to a transient state before a wait timer associated with the layer-2 protection scheme has expired; and
    monitoring a connectivity of a path based on the link availability status using a layer-3 protection scheme, the path including the source node, the LAG and the destination node.

8. The method of claim 7, wherein the layer-3 protection scheme uses a bi-directional forwarding detection (BFD) protocol.

9. The method of claim 7, wherein the link availability status indicates whether at least one of the first link and the second link is available for carrying traffic.

10. The method of claim 7, further comprising selecting one of the first and second links for carrying traffic based on the link availability status using the layer-2 protection scheme.

11. The method of claim 10, further comprising monitoring the connectivity of the path based on the selected link using the layer-3 protection scheme.

12. The method of claim 7, further comprising determining a path availability status for the path based on the connectivity of the path using the layer-3 protection scheme.

13. The method of claim 12, further comprising routing traffic along the path based on the path availability status.

14. The method of claim 7, further comprising routing traffic along the path based on the connectivity of the path.

15. The method of claim 7, further comprising:
    monitoring the connectivity of the path through the first link using the layer-3 protection scheme;
    determining that the first link is not available for carrying traffic using the layer-2 protection scheme, the link availability status indicating that the first link is not available;

determining that the second link is available for carrying traffic using the layer-2 protection scheme, the link availability status indicating that the second link is available;

selecting the second link for carrying traffic based on the link availability status using the layer-2 protection scheme; and monitoring the connectivity of the path through the second link based on the selection of the second link using the layer-3 protection scheme.

16. An apparatus for determining a path between nodes in a network comprising:

a link aggregation agent (LAA) operable to:

determine a link availability status for each of a first link and a second link included in a link aggregation group (LAG) using a layer-2 protection scheme, the LAG communicatively coupling a source node to a destination node, the layer-2 protection scheme includes a link aggregation control protocol (LACP), the link availability status determined using an enhanced LACP state machine that is operable to determine the link availability status and select one of the first and second links, the enhanced LACP state machine comprising a bypass bit configured to enable the enhanced LACP state machine to transition from a waiting state to a transient state before a wait timer associated with the layer-2 protection scheme has expired; and select between one of the first and second links for carrying traffic based on the link availability status using the layer-2 protection scheme; and a layer-3 protection (L3P) unit communicatively coupled to the LAA and operable to:

receive the selected link from the LAA; and monitor a connectivity of a path based on the selected link using a layer-3 protection scheme, the path including the source node, the LAG and the destination node.

17. The apparatus of claim 16, wherein the layer-3 protection scheme includes a bi-directional forwarding detection (BFD) protocol.

18. The apparatus of claim 16, wherein the link availability status indicates whether at least one of the first link and the second link is available for carrying traffic.

19. The apparatus of claim 16, wherein the LAA is operable to determine the link availability status and select one of the first and second links in less than ten (10) milliseconds.

* * * * *